United States Patent [19]

Morgan

[11] Patent Number: 4,863,257
[45] Date of Patent: Sep. 5, 1989

[54] EYEGLASS LOOP CONNECTION

[76] Inventor: Richard H. Morgan, 134 S. Gain St., Anaheim, Calif. 92804

[21] Appl. No.: 249,509

[22] Filed: Sep. 26, 1988

[51] Int. Cl.$^4$ ........................... G02C 5/14; G02C 3/02
[52] U.S. Cl. ..................................... 351/123; 351/156
[58] Field of Search ...................... 351/123, 156, 157; 2/13, 14; 24/3 C

[56] References Cited

U.S. PATENT DOCUMENTS

| | | |
|---|---|---|
| 3,588,960 | 6/1971 | McClellan et al. |
| 3,874,776 | 4/1975 | Seron ................................... 351/123 |
| 4,461,549 | 7/1984 | Reese ................................... 351/123 |
| 4,662,729 | 5/1987 | Dobson ................................ 351/123 |

Primary Examiner—Rodney B. Bovernick
Attorney, Agent, or Firm—James D. Thackrey

[57] ABSTRACT

A device for securing eyeglasses to the ear of the wearer, using a ring of stretched elastomer on the bow or temple piece forward of the ear and adjustable in position. A loose loop of flexible line is tied to the ring, and extends in a larger loop around the ear at its base, with a sheath for padding where it touches the ear. The wearer adjusts the ring so as to create a slight force in the larger loop, which force prevents the bow from lifting off the top of the ear, which in turn prevents the eyeglasses from slipping forward down the slope of the nose.

8 Claims, 1 Drawing Sheet

EYEGLASS LOOP CONNECTION

BACKGROUND OF THE INVENTION

1. Field of the Invention

This invention lies in the field of accessories for securing spectacles or eyeglasses to the wearer's head. More specifically, it is a device to attache the temple pieces or bows to the wearer's ears.

2. Description of Prior Art

Conventional eyeglasses, sunglasses, or spectacles have a bridge between the lenses which nests or is supported on pads on the wearer's nose, and temple pieces or bows which extend from the outer extremity of the lenses back over the wearer's ears. The bows are commonly curved at the rear end to engage the rear side of the ear so as to prevent the common problem in which the glasses ride forward on the head, assisted by the downward slant of the nose. This common problem becomes more severe when the wearer is engaged in an activity which causes him to move or to jerk his head.

The portion of the prior art which is directed toward solving this problem includes contouring the hook at the rear end of the bow to make it press against the rear surface of the ear, springs urging the bows inward so as to grip the head, and a variety of configurations of straps attached to the bows and passing around the back of the head. When the curved portion of the bow was made springy so as to exert a steady retaining force, the force was usually so low as to be ineffective, and the constant pressure behind the ear was uncomfortable. Bows urged by springs to grip the head are similarly uncomfortable, and in long use somehow lose their effectiveness. The straps around the back of the head are considered unsightly, as well as being time-consuming to emplace and adjust for comfort.

My invention virtually eliminates the problem of localized, uncomfortable pressure spots behind the ear. At the same time its small size and unobtrusiveness make it difficult for an observer to see, eliminating the principal objection to straps. In terms of function, it is equally or more effective than the devices know through the prior art.

SUMMARY OF THE INVENTION

The invention consists of two loops of line such as monofilament fishing line. The loops are formed from a single piece of line. One is large enough to pass from a point o the eyeglass bow forward of the ear completely around the wearer's ear at its base; i.e., where the ear attaches to the head. This loop passes through a sheath of plastic tubing, used for cushioning behind the ear. The second loop is much smaller. It is only long enough to pass through a short section of rubber tubing called elsewhere a ring-like elastomer element. In use the elastomer tube is stretched over the eyeglass bow and rolled or pushed until it is forward of the ear. Then the larger loop is placed around the ear. It should be free of slack but should not be taut enough to pull the eyeglasses into uncomfortable contact with the nose. Adjustment of tension in the large loop is achieved by sliding or rolling the grommet-like elastomer element forward or backward on the bow.

DESCRIPTION OF THE PREFERRED EMBODIMENT

Figure 1:
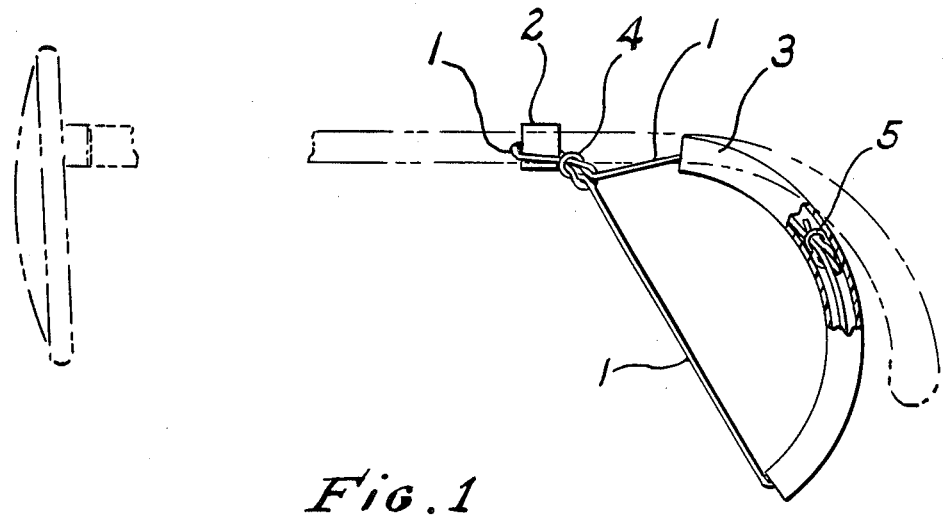
FIG. 1 is a view of the device as installed looking horizontally.
Figure 2:
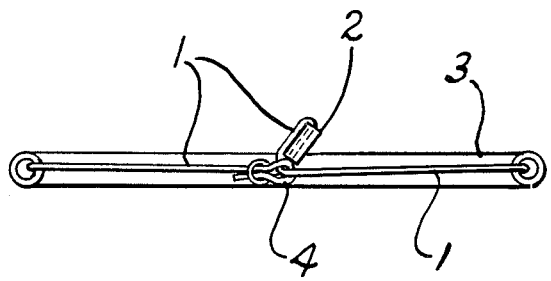
FIG. 2 is a view 90° from FIG. 1 and showing the device prior to installation on the eyeglass bows.

The preferred embodiment, shown in FIG. 1, is a simple combination of line, a sheath, a ring-like sleeve, and knots. It is the arrangement of parts which constitutes the invention and produces the desired effect. Variations such as substituting a chain, a multi-strand cord, or a ribbon for Item 1 would present a different appearance, but given the concept presented here are not inventive improvements. As shown in FIG. 1, Item 1 is a strand of monofilament line such as fishing line. That is the preferred embodiment in spite of the fact that it can be supplanted by more decorative flexible, tension-bearing constructions.

Item 2 is a short section of rubber tubing or other ring-like elastomeric element. It is of such a size that the elastomer has to be stretched to receive the bow or temple piece of the eyeglasses, the center opening being smaller in area than a cross-section of the bow at its straight portion forward of the ear. Because of this stretched condition, it will retain its longitudinal position under small forces, thus will transmit force in the flexible line 1 to the eyeglasses. When element 2 is in the correct position, there is practically no tension in flexible line 1, yet it is taut, devoid of slack.

A protective sheath, of flexible plastic tubing in the preferred embodiment, is Item 3. The sheath, which may be tubular functions to reduce the "footprint" of Item 1 flexible line on the sensitive skin in back of the ear. The enlarged contact area makes the device more comfortable for the wearer during extended use. Sheath 3 is shorter in length than the loop of flexible line 1 which it surrounds.

Knots 4 and 5 are shown as part of the preferred embodiment, Knot 5 only in FIG. 1. The knots comprise one means of permanent conversion of portions of flexible line 1 into a large first loop which encircles the wearer's ear and a small second loop one side of which passes through the ring-like element 2 and captures it.

In the preferred embodiment both knots rely on the square knot for non-slipping characteristics. Other non-slipping knots such as the bowline may be used, but for simplicity and economy of time in tieing the square knot, alone or backed up by additional twists or knots, is preferred.

It is also preferred to tie the small loop approximately in the center of the flexible line 1, in a manner which allows the loop to be loose on Item 2 ring. This looseness contributes to the service life of the device. Know 4 and the grommet 2 can be drawn into the center of sheath 3 while Knot 5 is tied, following which the sheath is slid over Knot 5 to its final position. These steps are matters of preference, as the invention would work as well were each free end of flexible line 1 separately tied, with a loose non-slipping loop, to Ring 2.

In use, it is clear from FIG. 1 that the flexible line 1, due to its being a loop, will pull the bow simultaneously rearward and downward at a rearward angle whenever the eyeglasses tend to move forward relative to the ear. These pulling forces will prevent the bow from rising at the rear end, which action, if not prevented, enables the bow to move forward and engage the wearer's nose at a lower point. Through adjustment of the foreaft position of Item 2, the ring-like elastomer element, the wearer can either apply no tension to the two sides of the first loop, or apply enough tension to render his eyeglasses secure yet comfortable.

Looked at as a problem in forces and motions, normally eyeglass bows rest on the top of the ear, so can move upward freely. Due to the curve, the part of the bow behind the ear can then slide forward, urged to do so by the slant of the nose. With my invention in place, the bow cannot move upward without also moving backward exerting more force on the nose. Force of the bow preventing its moving upward is exerted by the bottom of the ear, unlike any method yet proposed.

The invention having been described in its preferred embodiment, it is clear that modifications are within the ability of those skilled in the art without exercise of the inventive faculty. Accordingly, the scope of the invention is defined in the scope of the following claims:

I claim:

1. A device for attaching to the ear the bows of eyeglasses of the type having bows from the lens structure reaching behind the ear, comprising:
    a first loop of flexible line, larger than the circumference of the wearer's ear at its base, and formed by tieing together the ends of a length of flexible line, and
    a ring-like elastomer element having a center opening smaller in area than the cross-section of the bow, and
    a second loop formed by knots on said first loop of flexible line, said second loop passing once through the center of said ring-like elastomer element,
    said ring-like elastomer element being capable of retaining its location at any point along the length of the bow due it its stretched condition, including the location at which said first loop surrounds the wearer's ear at its base with no slack in the flexible line and said sheath is positioned over a portion of said first loop as desired by the wearer, thus preventing simultaneous forward and upward motion of the bow.

2. A device as in claim 1 in which said ring-like elastomer element is a short piece of rubber tubing.

3. A device as in claim 1 in which said loop of flexible line is monofilament fishing line.

4. A device as in claim 1 in which said loop of flexible line is transparent.

5. A device as in claim 1, further comprising:
    a protective sheath surrounding the flexible line in said first loop for part of the length of the flexible line.

6. A device as in claim 1, further comprising:
    a tubular protective sheath surrounding the flexible line in said first loop for part of the length of the flexible line, and in which said second loop is formed substantially equidistant from the ends of the length of line forming said first loop, by twisting the half-lengths of line together one turn backed by a square knot, and the free ends of the two half lengths are fastened together by a knot one portion of which is a square knot, the combination knot so formed being within the sheath during use.

7. A device for attaching to the ear a bow of eyeglasses having bows from the lens structure curving behind the ear, comprising:
    a section of flexible line longer than the distance from a point on the straight part of the bow, around the wearer's ear, and back to the same point on the bow, and
    a ring-like elastomer element having a center opening smaller than the cross sectional area of the bows in front of the ear, and
    two loops, each created on a free end of said section of flexible line by securely tieing said flexible line back on itself, and each passing once through the center of said ring-like elastomer element,
    whereby said ring-like elastomer element may be positioned along the bow with said section of flexible line passed around the ear, attaching the bow to the ear.

8. A device as in claim 7, further comprising:
    a tubular sheath surrounding the flexible line, said tubular sheath being shorter in length than said section of flexible line.

* * * * *